INVENTOR.
ROBERT MAYER
BY Donald R. Johnson
ATTORNEY

United States Patent Office 3,428,889
Patented Feb. 18, 1969

3,428,889
APPARATUS FOR MEASURING BLADE-DIE SPACING IN A PELLETIZER INCLUDING A ROTATING CAPACITOR BLADE
Robert Mayer, Ardmore, Pa., assignor to Sun Oil Company, Philadelphia, Pa., a corporation of New Jersey
Filed Mar. 16, 1966, Ser. No. 534,688
U.S. Cl. 324—61     2 Claims
Int. Cl. G01r 27/26

ABSTRACT OF THE DISCLOSURE

The spacing between a rotating blade and a stationary surface over which the blade passes is measured by mounting one or more electrodes in the surface, and by coupling these electrodes and the blade to the frequency-determining circuit of an oscillator, to frequency modulate the oscillator as the blade passes over the electrodes.

---

This invention relates to apparatus for the measurement of spacing, and more particularly to apparatus for measuring the spacing between a moving member which passes over a surface, and that surface.

Often, a rotating blade or cutter is associated with the die of an extruding machine, to chop or cut up the material issuing through the die into pellets. Such a blade moves across the face of the die repetitively, in a cyclic manner.

In a certain type of extruding machine to which this invention is applicable, dynamic forces set up when the blade is rotating at a high rate of speed, and also windage, cause the spacing between the rotating blade and the face of the die to vary.

It is necessary, for various purposes, to measure the spacing between the cutting edge of the rotating blade and the face of the die. Previous apparatus devised for this purpose suffers from several disadvantages. In the first place, such apparatus has generally been unable to withstand the high temperatures associated with extrusion. In the next place, the readings obtained with such apparatus depend on the rotational speed of the blade, a fact which renders it difficult, if not impossible, to properly calibrate the apparatus. Finally, the prior apparatus often calls for something to be attached to the blade, which is undesirable, for various reasons.

An object of this invention is to provide a novel spacing measurement apparatus.

Another object is to provide a spacing measurement apparatus which is not adversely affected by high temperatures.

A further object is to provide, for a rotating blade, a spacing measurement apparatus giving readings which are entirely independent of the rotational speed of the blade.

A still further object is to provide, for a moving blade, a spacing measurement apparatus which does not call for the attachment of anything to the blade itself.

The objects of this invention are accomplished briefly, in the following manner:

One or more electrodes are mounted in the surface over which the moving blade passes, adjacent the path of movement of the blade, and these electrodes, as well as the blade itself, are coupled to the frequency-determining circuit of an oscillator. As the blade passes over the surface and thus over the electrodes, a variation in the frequency of the oscillator results, and the maximum variation in oscillator frequency is measured as an indication of the spacing between the blade and the stationary surface.

Figure 1:
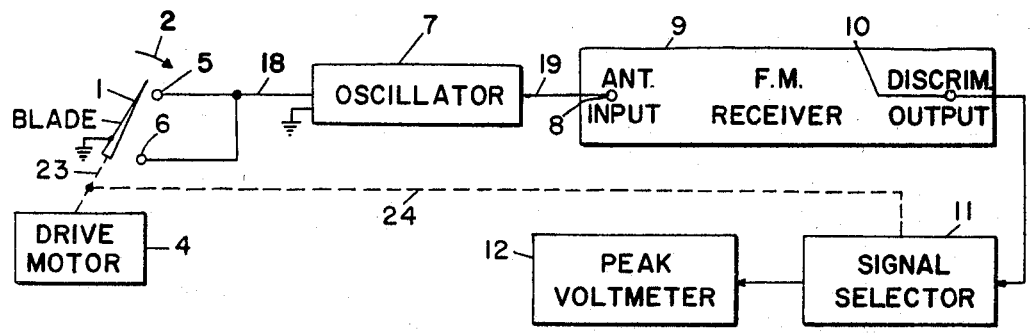
Figure 2:
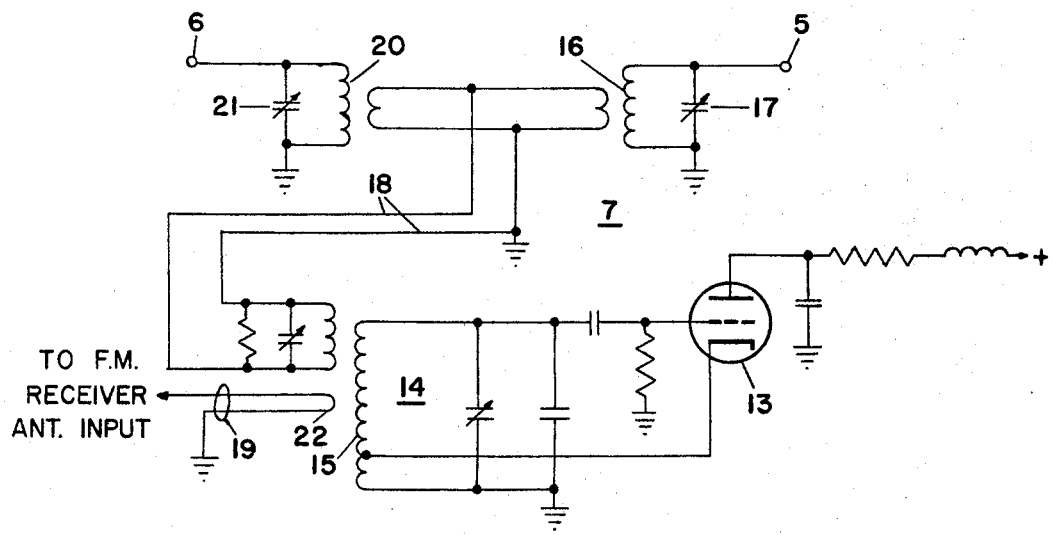
Figure 3:
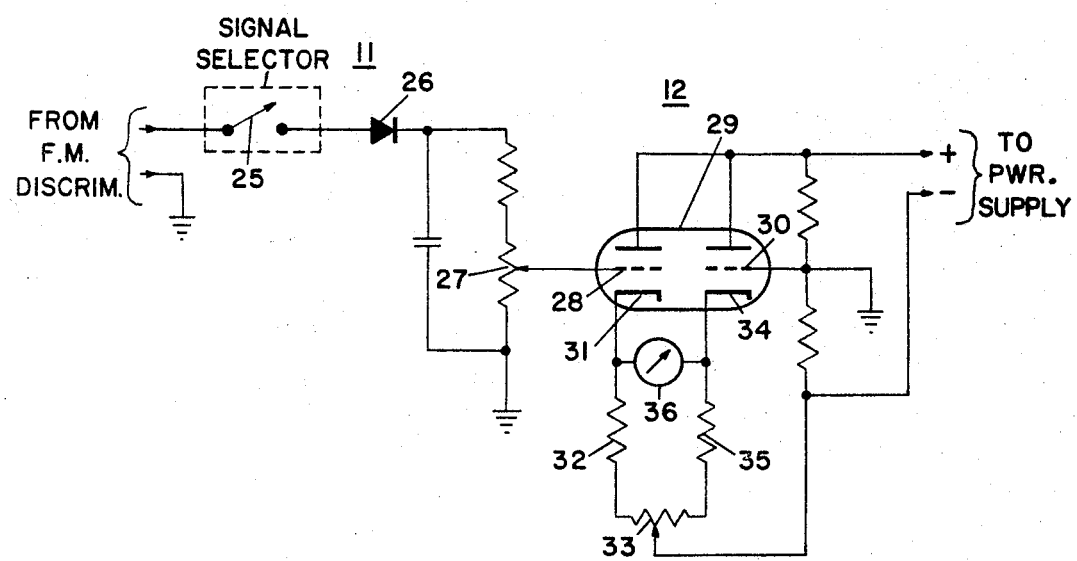
Figure 4:
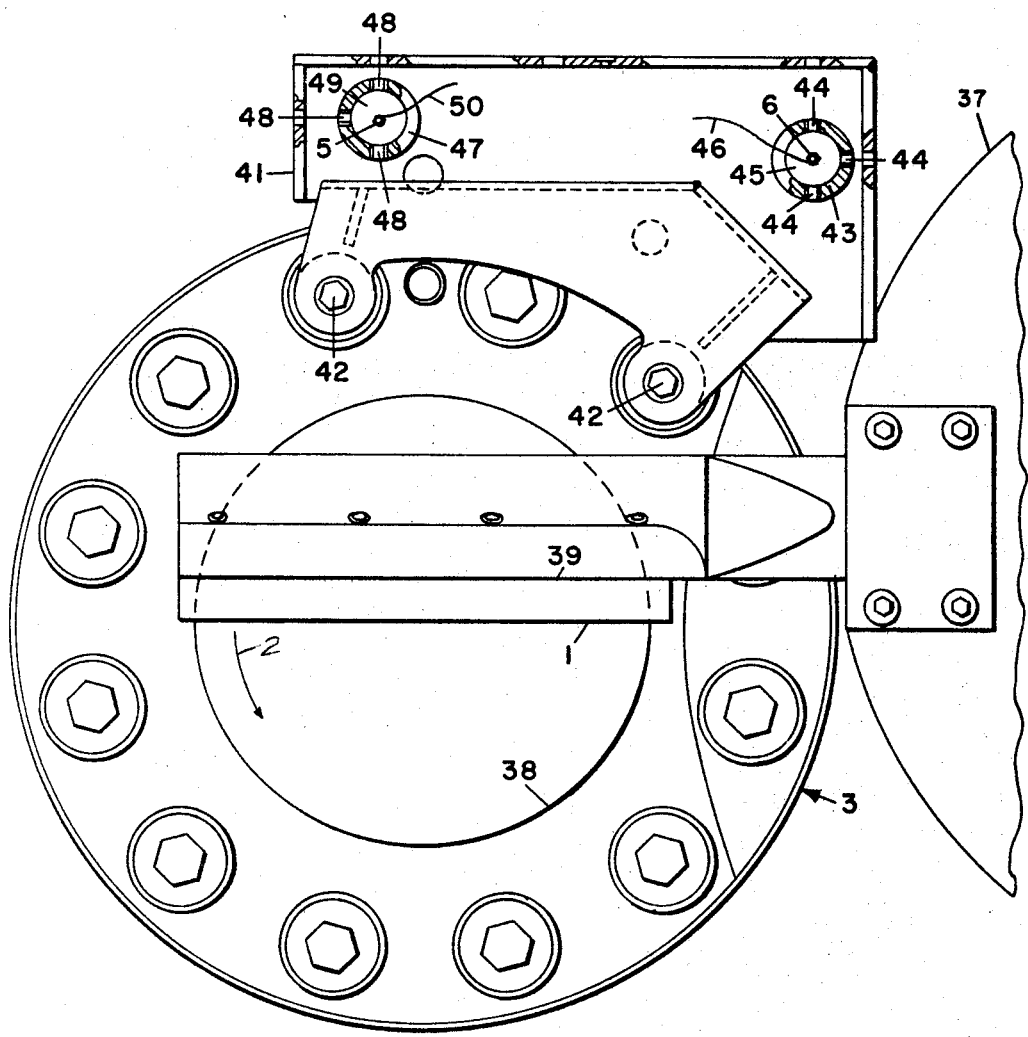

A detailed description of the invention follows, taken in conjunction with the accompanying drawings, wherein:

FIG. 1 is a block diagram of a spacing measurement apparatus according to this invention;
FIG. 2 is a circuit diagram of the oscillator used in the apparatus;
FIG. 3 is a circuit diagram of the peak voltmeter portion of the apparatus; and
FIG. 4 is a front or face view of the detecting portion of the apparatus, as set up to measure the spacing between the cutting edge of a rotating blade and the face of a die of an extruding machine, as the blade moves across that face.

Referring first to FIG. 1, a blade 1 is rotated in the direction of arrow 2 across a surface 3 (not shown in FIG. 1, but illustrated in FIG. 4, which will be described hereinafter) by means of a drive motor 4 acting through a drive shaft schematically indicated at 23. By way of example, the surface 3 may be the face of a die of an extruding machine across which the moving member 1 passes, and the blade may rotate about an axis at or beyond the lower end of the blade in FIG. 1. A pair of insulated electrodes 5 and 6 are fixedly mounted in surface 3, adjacent the path of movement of the blade 1; the blade itself is grounded. The electrodes are so positioned (as will be further described in connection with FIG. 4) that member 1 comes consecutively into operative (i.e., capacitive) relation with the individual electrodes, and these two electrodes are positioned to come into operative relation with two respectively different portions of blade 1.

Electrodes 5 and 6 are both coupled to the frequency-determining or tank circuit of an oscillator 7 which operates at a frequency of about 100 megacycles per second. As the blade 1 rotates, the capacitance to ground (the blade being at ground potential) of the electrodes 5 and 6 changes. When the blade 1 is not near the electrodes 5 and 6, the capacitance to ground of these electrodes is at a minimum. As the grounded blade approaches each electrode, the capacitance to ground of that particular electrode increases until it reaches a maximum over the electrode, and then starts to decrease as the blade passes the electrode.

The change in the capacitance to ground of the electrodes 5 and 6, as the blade 1 moves with respect thereto, causes the frequency of the oscillator 7 to vary, since as previously stated, the capacitance provided by these electrodes forms in effect a part of the oscillator tank circuit. The frequency-varying or frequency-modulated output of oscillator 7 is fed by means of a coupling 19, which may be a coaxial cable, to the antenna input terminal 8 of a frequency modulation radio receiver 9, which can be of conventional type since oscillator 7 operates at about 100 megacycles per second. In the receiver 9, the frequency-varying or frequency-modulated signal is converted in a discriminator to an amplitude-varying or amplitude-modulated signal, and this latter signal (which appears at discriminator output terminal 10) is fed through a signal selector 11 (to be described hereinafter) to the input of a peak-reading voltmeter 12.

The frequency-varying output of oscillator 7 produces a change in the amplitude of the discriminator output signal, and the peak value of this signal is directly related to the spacing between the blade 1 and the electrodes 5, 6 as the blade crosses over the electrodes (since the maximum capacitance between these electrodes and the blade is proportional to the smallest spacing therebetween, and since the oscillator frequency is proportional to the capacitance coupled to its tank circuit). Inasmuch as the electrodes 5, 6 are fixed with respect to the die face (as will be described subsequently), it is then possible to calibrate the apparatus for blade-die spacing.

Refer now to FIG. 2, which is the circuit schematic of the oscillator 7. This oscillator comprises an electron discharge device 13 connected to operate as a conventional Hartley oscillator with a frequency-determining or tank circuit 14 including a coil 15. The electrode 5 is combined with a coil 16 tuned by a trimmer capacitor 17 to form an electrode assembly, and this assembly is link coupled to oscillator coil 15 by way of conductors 18. The electrode assembly mentioned acts to change the frequency of oscillator 7 as the capacitance to ground of electrode 5 changes (when blade 1 comes into operative relation therewith). It may be seen that when the grounded blade 1 comes into operative relation with electrode 5, this has the effect of placing an additional capacitance across capacitor 17. Similarly, the electrode 6 is combined with a coil 20 tuned by a trimmer capacitor 21 to form a second electrode assembly, and this second assembly is also link coupled to oscillator coil 15 (essentially in parallel with electrode 5) by way of conductors 18. The second electrode assembly acts to change the frequency of oscillator 7 as the capacitance to ground of electrode 6 changes (when blade 1 comes into operative relation therewith). It may be seen that when the grounded blade 1 comes into operative relation with electrode 6, this has the effect of placing an additional capacitance across capacitor 21.

The frequency modulated signal is taken from oscillator 7 by means of a coaxial line 19 at one end of which there is a loop 22 which is coupled to coil 15; the other end of line 19 is connected to antenna input terminal 8 of receiver 9 (see FIG. 1).

Refer now to FIG. 3. The amplitude-modulated or amplitude-varying signal produced at the discriminator output is fed from the discriminator output terminal 10 (FIG. 1) through a signal selector 11 to the input of a D.C.-coupled peak reading voltmeter 12. The signal selector 11 is depicted as a switch, and when this switch is closed the discriminator output signal is fed to the voltmeter, and the voltmeter is in effect then gated "on".

As previously described, two electrodes 5 and 6 are installed in the surface over which the moving member or blade passes. A typical extruding machine may involve three blades rotating on the same hub; thus six signals indicating spacings are produced by the apparatus of the invention, per complete revolution of the drive shaft 23. To permit identification of these signals, the signal selector 11 is utilized; this unit will now be described. The signal selector 11 comprises a magnet (not shown) which is fastened to a shaft 24 (FIG. 1) geared to the drive shaft 23. As the magnet rotates, it actuates a series of reed switches one of which is illustrated at 25, and any one of which may be selectively connected in series between the discriminator output and the voltmeter input. Thus, as the magnet rotates, all of the reed switches are actuated in sequence, but the particular one selected (i.e., the particular one connected into circuit between the discriminator output and the voltmeter input) gates the peak reading voltmeter (i.e., connects the discriminator output signal thereto) at the proper time so that the reading obtained at the volemeter output represents the particular spacing selected for measurement. In FIG. 3, the switch 25 represents the one reed switch which has been selected.

It may be appreciated, from what has gone before, that the oscillator frequency change produced as the blade 1 passes over either of the electrodes 5 or 6 (and, thus, the signal at the output of the discriminator) depends upon the blade-electrode spacing, and is entirely independent of the speed of the blade. Also, it is pointed out that the coupling, from the discriminator output on through to the voltmeter output, is a so-called D.C. coupling. Therefore, the apparatus of this invention may be calibrated while the blade is stationary, and during the calibration the blade may be moved manually through small angles, as necessary.

Referring again to FIG. 3, when the proper signal appears at the discriminator output, reed switch 25 closes to gate this signal to the voltmeter input. The signal passes through a diode 26 and is applied via a gain control potentiometer 27 to one grid 28 of a twin triode electron discharge device 29, for example a Type 12AU7 vacuum tube. The two anodes of device 29 are connected directly together, and the other grid 30 of tube 29 is grounded. To complete the differential-type peak reading circuit, one cathode 31 of device 29 is connected through a fixed resistor 32 to one end of a potentiometer 33 whose movable tap is connected to a negative point on the power supply, and the other cathode 34 is connected through a fixed resistor 35 to the other end of potentiometer 33. A D.C. microammeter 36 is connected directly between the cathodes 31 and 34.

The circuit of FIG. 3 operates to indicate the peak value of the discriminator output signal (which, as previously stated, is directly related to the spacing between the blade and the electrode as the blade crosses the latter) on the meter 36, when the proper signal is gated (by means of signal selector 11) into the voltmeter 12.

Referring again to FIG. 1, an oscilloscope can be used instead of, or in conjunction with, the voltmeter 12, for measuring the signal taken from the discriminator terminal 10.

Referring now to FIG. 4, which illustrates the apparatus of the invention as used to measure the spacing between the cutting edge of a rotating blade moving across the face of a die of an extruding machine and that face, the numeral 3 indicates the end face of the extruding machine, in which is located the die opening 38. The end face 3 is the surface across which blade 1 moves. The blade 1 is mounted in a holder 39 which is caused to rotate in the plane of the paper in the direction indicated by arrow 2, about an axis perpendicular to the plane of the paper and off the paper, to the right. The described rotation of the blade and holder is effected by means of a drive motor 4 (FIG. 1) which rotates a drive shaft to which is secured a hub 37 of appreciable diameter. The drive shaft 23 (FIG. 1) is located off the paper to the right in FIG. 4, and its axis extends perpendicular to the plane of the paper. The blade holder 39 is secured to hub 37.

A mounting bracket 41 is bolted at 42 to the end face 3 of the machine, this bracket extending radially outwardly beyond the edge of end face 3 but in a location such that the blade 1, during its rotation, passes over this bracket. An annular metallic holder 43 is suitably secured to bracket 41, in such a location that the inboard portion of the blade 1 passes thereover, and in this holder is secured, as by means of set screws 44, a disc 45 which mounts the electrode 6 made of conducting material. Disc 45 is made of insulating material, and may be made, for example, of the tetrafluoroethylene resin known as "Teflon." The outer end of electrode 6 extends outwardly (i.e., toward the observer) beyond the outer end of holder 43, to a location closely adjacent to the path of blade 1 but spaced sufficiently therefrom to not interfere with the rotation of the latter. Thus, the member or blade 1, as it rotates, approaches the electrode 6 and comes into capacitive relation therewith, the action then being as described hereinabove. A wire lead 46, extending to electrode 6, serves to connect this electrode to the oscillator, the connections being as previously described.

An annular metallic holder 47 is suitably secured to bracket 41, in such a location that the outboard portion of the blade 1 passes thereover, and at a radial distance from the center of die 38 which is different from that of holder 43, such that the blade 1 will pass sequentially rather than simultaneously over the holders 43 and 47. In holder 47 there is secured, as by means of set screws 48, a disc 49 which mounts the electrode 5 made of conducting material. Disc 49 is made of insulating material and, like disc 45, may be made of the material known as "Teflon." The outer end of electrode 5 extends outwardly (i.e., toward the observer) beyond the outer end of holder 47, to a location closely adjacent to the path of blade 1 but spaced sufficiently therefrom to not interfere with the rotation of the latter. Thus, the member or blade 1, as it rotates, approaches the electrode 5 and comes into capacitive relation therewith, the action then being as described hereinabove. A wire lead 50, extending to electrode 5, serves to connect this electrode to the oscillator, the connections being as described hereinabove. As previously stated, the inboard portion of blade 1 passes over electrode 6, and the outboard portion of this blade passes over electrode 5. That is to say, the portion of the blade 1 near the hub 37 passes over electrode 6, and the outer end portion of the blade 1 passes over electrode 5. The two-insulated-electrode arrangement 5, 6 enables measurement of the blade-face spacing to be made at two different points on the blade; this is necessary since in many cases different portions of the same blade tend to be at different spacings with respect to the extruder face.

The apparatus of this invention may have other uses, in addition to the blade-die spacing measurement described above. For example, it may be used to measure the amplitude of vibration of a vibrating reed, as the energizing frequency of the reed is varied.

The invention claimed is:

1. In combination, a surface, an elongated metallic member, driving means for passing said member cyclically over said surface, a plurality of insulated capacitive electrodes fixedly mounted on said surface in such positions that different portions of the length of said member pass respectively over individual ones of said electrodes, an oscillator, means coupling said member and all of said electrodes to the frequency-determining circuit of said oscillator, and means for measuring the maximum variation in frequency of said oscillator produced as said member passes over a preselected one of said electrodes, the maximum frequency variation of said oscillator being dependent upon the spacing between said member and said preselected one of said electrodes.

2. In combination, a surface, a metallic member, driving means for passing said member cyclically over said surface, a plurality of insulated capacitive electrodes fixedly mounted on said surface in such positions that said member passes sequentially over individual ones of said electrodes, an oscillator, means coupling said member and all of said electrodes to the frequency-determining circuit of said oscillator, means constructed and arranged to measure the maximum variation in frequency of said oscillator produced as said member passes over said electrodes, and means operating in timed relationship with the movement of said member for effectively passing a frequency variable signal from only a preselected one of said electrodes to said measuring means, the maximum frequency variation of said oscillator being dependent upon the spacing between said member and said preselected one of said electrodes.

References Cited

UNITED STATES PATENTS

| 2,842,738 | 6/1958 | Warnick | 324—61 |
| 2,925,590 | 2/1960 | Boltinghouse et al. | 324—61 XR |

FOREIGN PATENTS 1,257,462  12/1961  France.

RUDOLPH V. ROLINEC, *Primary Examiner.*

E. E. KUBASIEWICZ, *Assistant Examiner.*